United States Patent [19]

Sims

[11] 4,001,765
[45] Jan. 4, 1977

[54] PRESSURE COMPENSATING SOUND TRANSDUCER APPARATUS
[75] Inventor: Claude C. Sims, Orlando, Fla.
[73] Assignee: Marine Resources, Inc., Fern Park, Fla.
[22] Filed: Mar. 31, 1975
[21] Appl. No.: 563,845
[52] U.S. Cl. .................. 340/8 PC; 340/7 PC; 340/12 R
[51] Int. Cl.² .................................. H04B 13/00
[58] Field of Search .......... 340/8 R, 8 PC, 8 LF, 340/8 MN, 9, 10, 11, 12 R, 13 R, 14, 7 PC

[56] References Cited
UNITED STATES PATENTS

| | | | |
|---|---|---|---|
| 1,312,510 | 8/1919 | Baker | 340/8 PC |
| 2,390,847 | 12/1945 | Olson | 340/8 R |
| 2,404,784 | 7/1946 | Bostwick | 340/14 |
| 2,405,179 | 8/1946 | Black, Jr. et al. | 340/8 R |
| 3,118,125 | 1/1964 | Sims | 340/8 LF |
| 3,219,970 | 11/1965 | Sims | 340/8 MM |
| 3,264,605 | 8/1966 | Vincent | 340/8 PC |
| 3,760,346 | 9/1973 | Kieser et al. | 340/8 R |
| 3,764,966 | 10/1973 | Abbagnaro | 340/8 PC |

Primary Examiner—Harold Tudor
Attorney, Agent, or Firm—Duckworth, Hobby, Orman, Allen & Pettis

[57] ABSTRACT

An electromagnetic, high compliance, high displacement low frequency underwater sound transducer is provided for use at great depths without gas compensation. Fluid filled chambers having flexible walls of predetermined area and compliance provide proper acoustic impedance to allow large transducer diaphragm displacements to radiate high power with reasonable efficiency when connected to a chamber located behind the transducer diaphragm.

10 Claims, 2 Drawing Figures

PRESSURE COMPENSATING SOUND TRANSDUCER APPARATUS

BACKGROUND OF THE INVENTION

The present invention relates to pressure compensating sound transducer and especially to an electromagnetic, high compliance, high displacement low frequency underwater sound transducer for use at great depths without gas compensation.

In the past, a great variety of sound transducers have been provided for use underwater and at varying pressures. Typically, the transducers are mounted through the hull of a ship, submarine, torpedo target, or the like, with a flexible sealing diaphragm sealing the sea water from the transducer but allowing the transmission of sound through the sealing diaphragm. The acoustic waves are generated by the transducer which may be an electromagnetic actuated piston actuated in response to electrical signals. A pressure differential exists between the sea water and against the sealing diaphragm and the interior of the hull supporting the transducer, requiring compensating or pressure release materials on the hull side of the transducer in order to permit pressure response of the transducer. In low pressure situations, soft materials such as air cell material, cork, air filled rubber and the like may be used behind the transducer to compensate for the pressure differential. However, for deep submergence and greater pressures, the hydrostatic pressure may exceed several hundred pounds per square inch which pressures impair performance, especially at low frequencies. In such high pressures it is common to use piezo electric transducers or to go to special compensating techniques for handling very low acoustic signals in electromagnetic transducers. These systems typically use a compressible gas which adjusts for the different pressures by compressing the gas to a smaller volume thereby balancing the pressure on both sides of the transducer diaphragm. At great depths and low frequencies this results in very large air filled chambers because of the great amount of compression with large pressures and thereby becomes impractical. The situation is sometimes handled by running air lines from the surface to the transducer and maintaining the pressure with pumps adjusted to the pressure for the particular depth that the transducer is operating. This, however, presents the problem of having to use long, flexible lines, along with high pressure pumps and maintaining the pressure adjusted for each different depth that the transducer is to be operated. It also requires a surface vessel to be located over the site of the transducer. Other techniques have been employed to deal with ambient pressures which vary between wide limits, such as when the transducers are subjected to a wide range of depths. Such techniques include the Toulis U.S. Pat. No. 3,277,433 and 3,274,537 and 3,021,504 directed towards compressing a plurality of air and gas filled tubes to compensate for the back pressure on the transducer. This system requires a large number of tubes and a large amount of space in order to compensate for great depths and low frequencies. At great depths, foam rubber or foam plastics collapse under hydrostatic pressure which may be equal to more than one thousand atmospheres of pressure. Also, the pressure release capability of air under such pressure is materially decreased if not eliminated since the density of air approaches out of the sea water environment. To compensate for such depths, various inventions have provided an air-tight system such as U.S. Pat. No. 3,277,434 which provides air-tight, air filled conical disc springs placed in close relation to the radiating surface from which it is desired to suppress the radiation and by having the spring require a relatively large amount of force to deflect air to a predetermined percent of its height. The Vincent U.S. Pat. No. 3,265,605 teaches an additional compliant tube for compensating for the hydrostatic pressure in an electromechanical tranducer similar to the technique taught in the Toulis patent. The Harris U.S. Pat. Nos. 3,018,466 and 3,108,247 teach a depth compensating transducer having a depth compensating reservoir. The Behrendt, et al, patent teaches a deep submergence transducer utilizing a collapsible diaphragm structure while the Wallen, et al., U.S. Pat. No. 3,501,741 utilizes mechanical spring biased pistons for pressure compensation. The Thompson U.S. Pat. No. 3,480,906 has the space between the inertia loading mass and the transducer element filled with a pressure transmitting compliant material while the Chatten, et al., U.S Pat. No. 3,296,583 is a hydrostatic pressure responsive apparatus utilizing a substantially cylindrical elastomeric envelope mounted in air-sealed condition on a spool-shaped frame to define a variable volume reservoir with the frame being formed with gas passageways to receive gas under pressure from the reservoir and to pass a gas to the closed chamber of the transducer. One prior art U.S. Pat. No. 2,978,672 to Barney for a hydrophone teaches a pressure compensating hydrophone connected to the rear of a transducer diaphragm using an automatic pressure operated valve for admitting fluid to the rear of the diaphragm whenever the pressure difference between the two faces exceeds a preassigned threshold and for withdrawing fluid from the rear face of the diaphragm when the pressure falls below a preassigned threshold.

The present system on the other hand teaches a solution to the pressure release of low frequency underwater sound transducers which permits operation without gas compensation by the use of pressure stiff chambers or hoses, or the like, with proper dimensions and compliance to provide the proper acoustic termination of the backside of a diaphragm of the transducer.

SUMMARY OF THE INVENTION

The present invention relates to a pressure compensating sound transducer for use at great depths without gas compensation and includes a transducer housing adapted to be attached to a hull surface, or the like, and a sealing diaphragm mounted to the transducer casing for sealing an opening in the casing against the entry of sea water without affecting transmission of the acoustic energy. An electromagnetic driven piston generates the acoustic energy and a liquid filled chamber is formed by the casing in the back of the piston. A liquid filled impedance matching system for compensating for the pressure at different depths is openly coupled to the liquid filled chamber formed in the casing and has a plurality of liquid filled chambers or hoses having stiff, flexible walls of predetermined area and compliance to provide the necessary pressure release so that a low frequency underwater sound transducer can operate without gas compensation.

BRIEF DESCRIPTION OF THE DRAWINGS

Other objects, features and advantages of the present invention will be apparent from the written description and the drawings in which.

DETAILED DESCRIPTION OF THE PREFERRED EMBODIMENT

Figure 1:
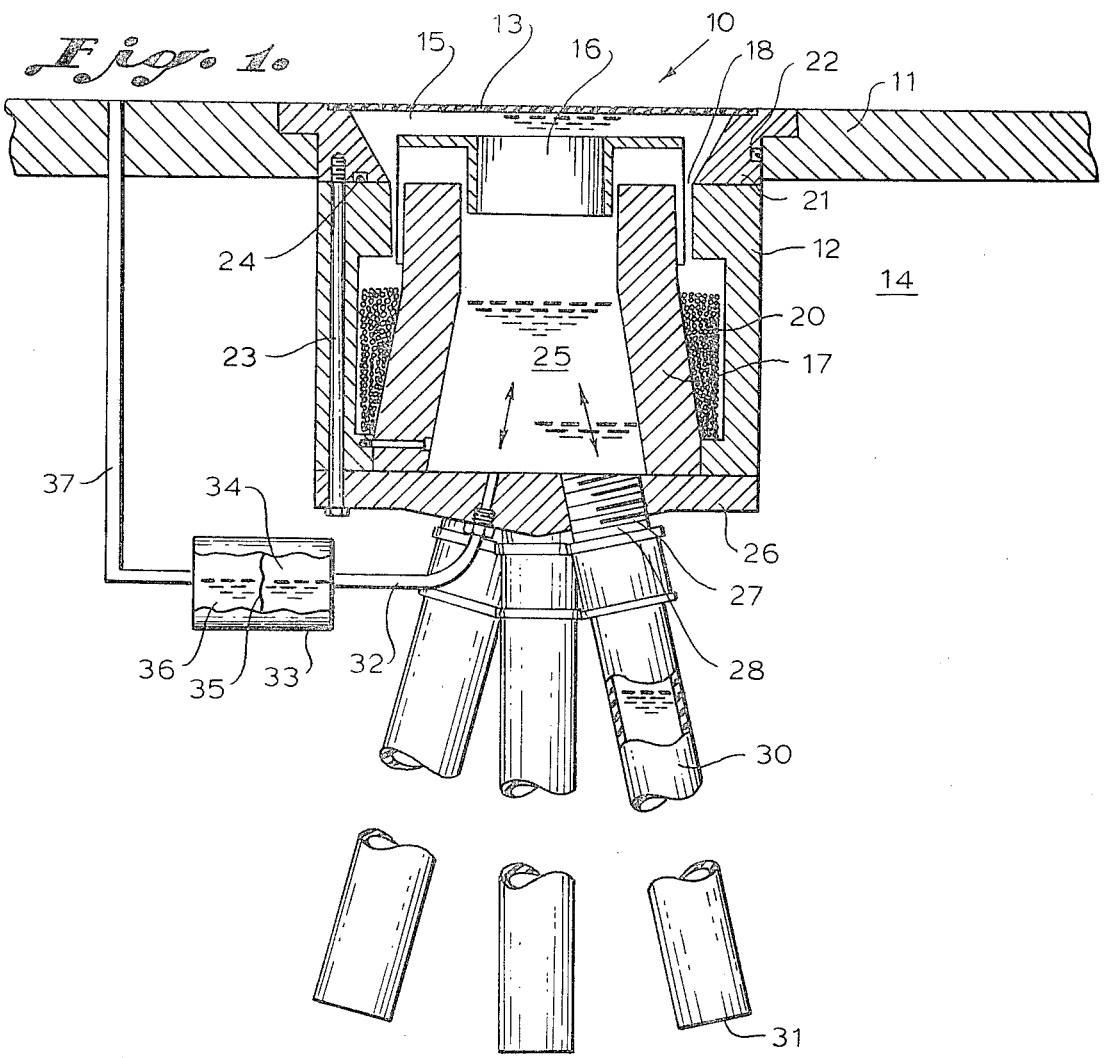
FIG. 1 is a cut-away sectional view of a preferred embodiment of the present invention.

Referring to FIG. 1 of the drawings, a preferred embodiment of the present invention is illustrated having a sound transducer 10 mounted to a hull 11 and having a casing 12. The transducer 10 has a rubber sealing diaphragm member 13 mounted across the front to keep sea water from entering the transducer 10. The other side 14 of the hull 11 would typically be at atmospheric pressure with the casing 12 protruding thereinto. Behind the diaphragm 13 is an area 15 filled with oil and having a transducer piston or diaphragm 16 movably mounted to a base member 17. Piston 16 has a plurality of wraps of a coil 18 wrapped therearound. Piston 16 rides between the base 17 and the casing 12. A plurality of electromagnetic coil windings 20 are wrapped around transducer base 17 for producing an electromagnet for actuating the piston 16 to generate the acoustic energy which energy passes through the oil chamber 15 and against the diaphragm 13 into the sea water.

The casing 12 has brackets 21 along with seals 22 and 24 which are attached to the remainder of the casing with bolts 23. A chamber 25 is located directly behind the piston 16 and is filled with oil and receives the back pressure from the piston as the piston is vibrated by electrical signals impinged upon coil 18. It should be clear at this point that while an electromagnet is illustrated, that a permanent magnet could be used without departing from the spirit and scope of the invention.

The bottom of the casing 26 has a plurality of threaded openings 27 therein with threaded connections 28 mounted therein having a plurality of chambers 30 which in this case are pressure hoses. Three hoses are illustrated, each of which could be six feet long extending into the atmospheric air on the hull side 14. Hoses 30 act as impedance matching devices to match the hull atmospheric air pressure with the sea water located on the opposite side of the hull 11. The rubber pressure hoses are filled with oil and are openly coupled to the chamber 25. The hose ends 31 are sealed. A small line 32 is connected to a pressure compensator 33 which has an oil chamber 34 coupled to the oil chamber 25 on one side of a membrane 35. A sea water chamber 36 has sea water connected through line 37 through the hull 11 to the open sea water to maintain the pressure of the sea water near the transducer 11. The transducer, as illustrated, eliminates compressed air as a pressure release mechanism and allows the increased force possible with electromagnets with vanadium permunder magnetic material to increase the output of the transducer over a piezo electric type, in contrast to the other various pressure release ideas such as compliant tubes, air bags and the like, which are generally too big or inadequate in the very low frequency realm. The hoses 30 act as low "Q" transmission lines and are filled with a silicone fluid and have been shown to be capable of supporting the hydrostatic pressure load. The compliance and mass of the whole fluid system gives a low propagation velocity. Thus, the pressure release is actually the atmospheric air from the inner side of the hull 14 with the hose acting as a high impedance to the static pressure and considerably lower impedance as the frequency increases.

Figure 2:
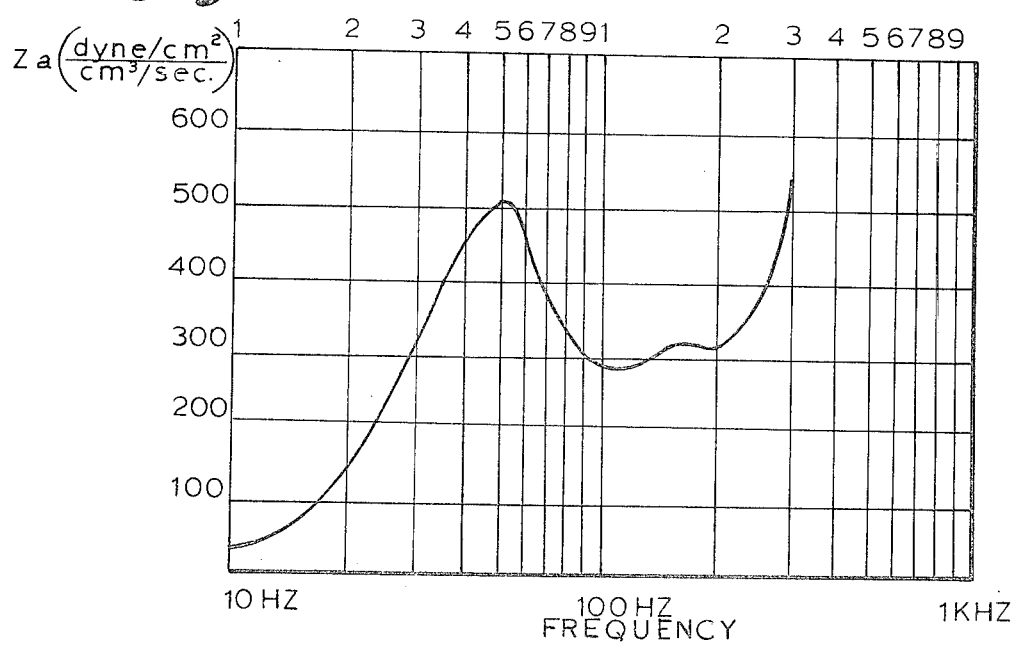
FIG. 2 is a chart of the acoustic impedance measurement at different frequencies of one embodiment.

As illustrated in FIG. 2, utilizing a DC200 oil and a 6 foot section of hose acting as a single cavity to ascertain the acoustic impedance of the output to the hose, a graph has been plotted of the acoustic impedance measurements in which the frequency is computed in hertz on the bottom line against the impedance $Z_a$ in $$\frac{dyne/cm^2}{cm^3/sec}$$

when utilizing a tube length of 1.78 meters. In the tested system, a longitudinal resonance of the hose occured at 14 hertz raising the possibility of very low frequency system utilizing the hose as a compliant pressure stiff spring, especially useful for a very low frequency system.

It should be clear at this point that an electromagnetic high compliant high displacement low frequency underwater sound transducer for use at great depths without gas compensation has been provided. It should also be clear that other embodiments are contemplated as being within the scope of the invention, such as having the tubes 30 of different shapes other than cylindrical or other materials other than pressure rubber hose material provided the material has the necessary flexible walls of the predetermined area and compliance required for the system. Accordingly, this invention is not to be construed as limited to the particular forms disclosed herein since these are to be regarded as illustrative rather than restrictive.

I claim:

1. A low frequency pressure compensating sound transducer comprising in combination:
    transducer casing adapted to be attached through a surface;
    sealing diaphragm mounted to said casing for sealing an opening in said casing;
    movable piston movably mounted in said casing;
    piston driving means for moving said piston when actuated;
    a liquid filled chamber formed by said casing and said piston driving means;
    tubular liquid filled impedance matching means for matching the pressure on each side of said sealing diaphragm, said impedance matching means being openly coupled to said liquid filled chamber and said impedance matching means having flexible walls of predetermined area and compliance to provide pressure release to one side of said movable piston, whereby a pressure release for a low frequency underwater sound transducer operates without gas compensation; and
    a tube coupled between open sea water and said liquid filled chamber whereby a low frequency pressure transducer can be of small size.

2. The apparatus in accordance with claim 1 in which said tube coupled between sea water and said liquid filled chamber has a dividing membrane thereinside to separate said sea water from the liquid in said liquid filled chamber.

3. The apparatus in accordance with claim 1 in which said liquid filled impedance matching means is a pressure hose sealed at one end and openly attached to said liquid filled chamber.

4. The apparatus in accordance with claim 1 in which said liquid filled impedance matching means is a plurality of cylindrical chambers sealed at one end and openly coupled to said liquid filled chamber at the other end.

5. The apparatus in accordance with claim 1 in which said piston driving means is driven electromagnetically by electrical signals.

6. The apparatus in accordance with claim 1 in which said sealing diaphragm is a rubber diaphragm mounted to the front of the casing of the transducer.

7. The apparatus in accordance with claim 1 including an electromagnet located in said casing for producing a magnetic field for actuating said movable piston responsive to an electrical signal passing in said magnetic field.

8. A pressure compensating sound transducer comprising in combination:
- an underwater hull adapted to maintain substantially atmospheric pressure on the inside thereof and to withstand a higher pressure from the exterior thereof;
- a transducer casing mounted through an opening in said hull;
- a sealing diaphragm mounted to said transducer casing to seal the opening in said hull for isolating the interior of the transducer casing from the entry of sea water;
- a movably mounted piston attached to the interior of said transducer casing;
- piston driving means operatively connected to said piston for moving said piston when actuated to produce electrical signals;
- a liquid-filled chamber formed in said casing behind said piston driving means;
- an impedance matching means having at least one hollow, elongated cylinder operatively coupled to said liquid-filled chamber and being filled with liquid, each said elongated cylinder extending into the interior atmospheric pressure of said hull and having stiff, flexible walls of predetermined area and compliance so as to flex upon an increase of the liquid pressure therein responsive to vibrations of said movable piston to provide a pressure release to one side of said movable piston whereby a pressure release for low frequency underwater sound transducers operates without gas compensation; and
- coupling means connecting said liquid filled chamber inside said hull to the exterior of said hull, said coupling having a flexible membrane therein for isolating the liquid of said chamber from the sea water exterior of said hull for varying the pressure in said liquid filled chamber relative to the pressure surrounding said hull.

9. The apparatus in accordance with claim 8 in which said liquid filled impedance matching means includes a plurality of rubber pressure hoses sealed at one end and openly attached to said liquid filled chamber and having a predetermined diameter and length.

10. The apparatus in accordance with claim 9 in which said piston driving means has a coil and is remotely connected by electrical conductors for passing electrical signals of predetermined frequencies through said coil for actuating said piston driving means to generate acoustic signals in the surrounding sea water.

* * * * *